US011952953B2

(12) United States Patent
Tsuji et al.

(10) Patent No.: US 11,952,953 B2
(45) Date of Patent: Apr. 9, 2024

(54) ANOMALY DIAGNOSING APPARATUS AND ANOMALY DIAGNOSING METHOD FOR VEHICLE ON-BOARD INTERNAL COMBUSTION ENGINE

(71) Applicant: TOYOTA JIDOSHA KABUSHIKI KAISHA, Toyota (JP)

(72) Inventors: Tomoyuki Tsuji, Nagakute (JP); Naoya Okubo, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/312,004

(22) Filed: May 4, 2023

(65) Prior Publication Data

US 2023/0399992 A1 Dec. 14, 2023

(30) Foreign Application Priority Data

Jun. 8, 2022 (JP) ................................. 2022-093069

(51) Int. Cl.

*F02D 41/22* (2006.01)
*F01M 13/00* (2006.01)
*F02D 41/00* (2006.01)
*G07C 5/08* (2006.01)

(52) U.S. Cl.

CPC ............ *F02D 41/22* (2013.01); *F01M 13/00* (2013.01); *F02D 41/0025* (2013.01); *G07C 5/0808* (2013.01); *F01M 2013/0038* (2013.01); *F01M 2250/00* (2013.01); *F02D 2200/04* (2013.01); *F02D 2200/602* (2013.01)

(58) Field of Classification Search

CPC ..... F02D 41/0025; F02D 41/22; F01M 31/00; G07C 5/0808

See application file for complete search history.

(56) References Cited

U.S. PATENT DOCUMENTS

2014/0081551 A1* 3/2014 Rollinger .............. F01M 11/10 701/101
2020/0362787 A1* 11/2020 Tsuji ..................... F01M 13/04

FOREIGN PATENT DOCUMENTS

JP 2020-186702 A 11/2020

* cited by examiner

*Primary Examiner* — Kevin A Lathers
(74) *Attorney, Agent, or Firm* — Oblon, McClelland, Maier & Neustadt, L.L.P.

(57) ABSTRACT

An internal combustion engine includes a forced-induction device, a blow-by gas passage, and a PCV pressure sensor detecting a pressure in the blow-by gas passage as a PCV pressure. A period during which an intake fluctuation amount, which is a fluctuation amount of an intake air amount per unit time, is greater than or equal to a specified value is defined as a specific period. The diagnosing apparatus executes a process of calculating a pressure fluctuation amount, which is a fluctuation amount of the PCV pressure in the specific period, a process of correcting the pressure fluctuation amount to a smaller value when the intake air fluctuation amount in the specific period is relatively large than when the intake air fluctuation amount is relatively small, and a process of determining, based on the corrected pressure fluctuation amount, whether there is an anomaly in the blow-by gas passage.

7 Claims, 5 Drawing Sheets

ANOMALY DIAGNOSING APPARATUS AND ANOMALY DIAGNOSING METHOD FOR VEHICLE ON-BOARD INTERNAL COMBUSTION ENGINE

BACKGROUND

1. Field

The present disclosure relates to an anomaly diagnosing apparatus and an anomaly diagnosing method for a vehicle on-board internal combustion engine.

2. Description of Related Art

Japanese Laid-Open Patent Publication No. 2020-186702 discloses an internal combustion engine and an anomaly diagnosing apparatus for the internal combustion engine. Then internal combustion engine disclosed in Japanese Laid-Open Patent Publication No. 2020-186702 includes a forced-induction device, a blow-by gas accumulation space, a blow-by gas passage, and a positive crankcase ventilation (PCV) pressure sensor. The forced-induction device includes a compressor wheel. The compressor wheel is located in an intake passage. The accumulation space is a space defined by a cylinder head and a cylinder head cover. The accumulation space is connected to the interior of a crankcase. The accumulation space temporarily accumulates blow-by gas that has leaked from cylinders into the crankcase. The blow-by gas passage connects the accumulation space to a portion of the intake passage upstream of the compressor wheel (hereinafter, simply referred to as an upstream portion). The PCV pressure sensor detects a pressure in the blow-by gas passage.

In the internal combustion engine described above, when the intake air is pressurized by driving the forced-induction device, the upstream portion of the intake passage has a negative pressure. In this case, blow-by gas flows into the upstream portion of the intake passage through the blow-by gas passage. The intake air amount may change in the above-described situation, in which blow-by gas flows into the upstream portion of the intake passage. If the pressure in the upstream portion of the intake passage changes accordingly, the amount of blow-by gas flowing into the intake passage changes, and the pressure in the blow-by gas passage changes. In this manner, a change in the intake air amount and a change in the pressure in the blow-by gas passage are linked to each other.

When part of the blow-by gas passage is broken or the blow-by gas passage and the intake passage are partially disconnected from each other, the interior of the blow-by gas passage and the atmosphere outside the blow-by gas passage may be slightly connected to each other. In a case of such an anomaly, the amount of change in the pressure in the blow-by gas passage when the intake air amount changes is smaller than that in a normal state. Therefore, the above-described anomaly diagnosing apparatus for an internal combustion engine detects the presence of the anomaly by monitoring the intake air amount and the pressure in the blow-by gas passage.

For example, the intake air amount may rapidly change due to rapid acceleration of a vehicle or the like. In this case also, the amount of change in the pressure in the blow-by gas passage tends to be smaller when an anomaly like the one described above is occurring in the blow-by gas passage than when such an anomaly is not occurring. However, a rapid change in the intake air amount under a situation in which the above-described anomaly is occurring significantly increases the amount of change in the pressure in the blow-by gas passage. In this case, it may be erroneously determined that the blow-by gas passage is normal although there is an anomaly in the blow-by gas passage.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an anomaly diagnosing apparatus for a vehicle on-board internal combustion engine is provided. The vehicle on-board internal combustion engine includes a forced-induction device that includes a compressor wheel, an intake passage for conducting intake air into the vehicle on-board internal combustion engine, a blow-by gas passage that connects a portion of the intake passage that is upstream of the compressor wheel to an interior of a crankcase, and a PCV pressure sensor that is disposed in the blow-by gas passage and detects a pressure in the blow-by gas passage as a PCV pressure. A period during which an intake fluctuation amount, which is a fluctuation amount of an intake air amount per unit time, is greater than or equal to a specified value is defined as a specific period. The anomaly diagnosing apparatus comprises processing circuitry that is configured to execute a first process of calculating a pressure fluctuation amount, which is a fluctuation amount of the PCV pressure in the specific period, a second process of correcting the pressure fluctuation amount to a smaller value when the intake air fluctuation amount in the specific period is relatively large than when the intake air fluctuation amount is relatively small, and a third process of determining, based on the corrected pressure fluctuation amount, whether there is an anomaly in a portion of the blow-by gas passage between a section in which the PCV pressure sensor is installed and a portion that is connected to the intake passage.

In another general aspect, an anomaly diagnosing method for a vehicle on-board internal combustion engine is provided. The vehicle on-board internal combustion engine includes a forced-induction device that includes a compressor wheel, an intake passage for conducting intake air into the vehicle on-board internal combustion engine, a blow-by gas passage that connects a portion of the intake passage that is upstream of the compressor wheel to an interior of a crankcase, and a PCV pressure sensor that is disposed in the blow-by gas passage and detects a pressure in the blow-by gas passage as a PCV pressure. A period during which an intake fluctuation amount, which is a fluctuation amount of an intake air amount per unit time, is greater than or equal to a specified value is defined as a specific period. The anomaly diagnosing method comprises: calculating a pressure fluctuation amount, which is a fluctuation amount of the PCV pressure in the specific period; correcting the pressure fluctuation amount to a smaller value when the intake air fluctuation amount in the specific period is relatively large than when the intake air fluctuation amount is relatively small; and determining, based on the corrected pressure fluctuation amount, whether there is an anomaly in a portion of the blow-by gas passage between a section in which the PCV pressure sensor is installed and a portion that is connected to the intake passage.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An anomaly diagnosing apparatus for a vehicle on-board internal combustion engine according to one embodiment will now be described with reference to the drawings.

<Overall Configuration of Internal Combustion Engine>

Figure 1:
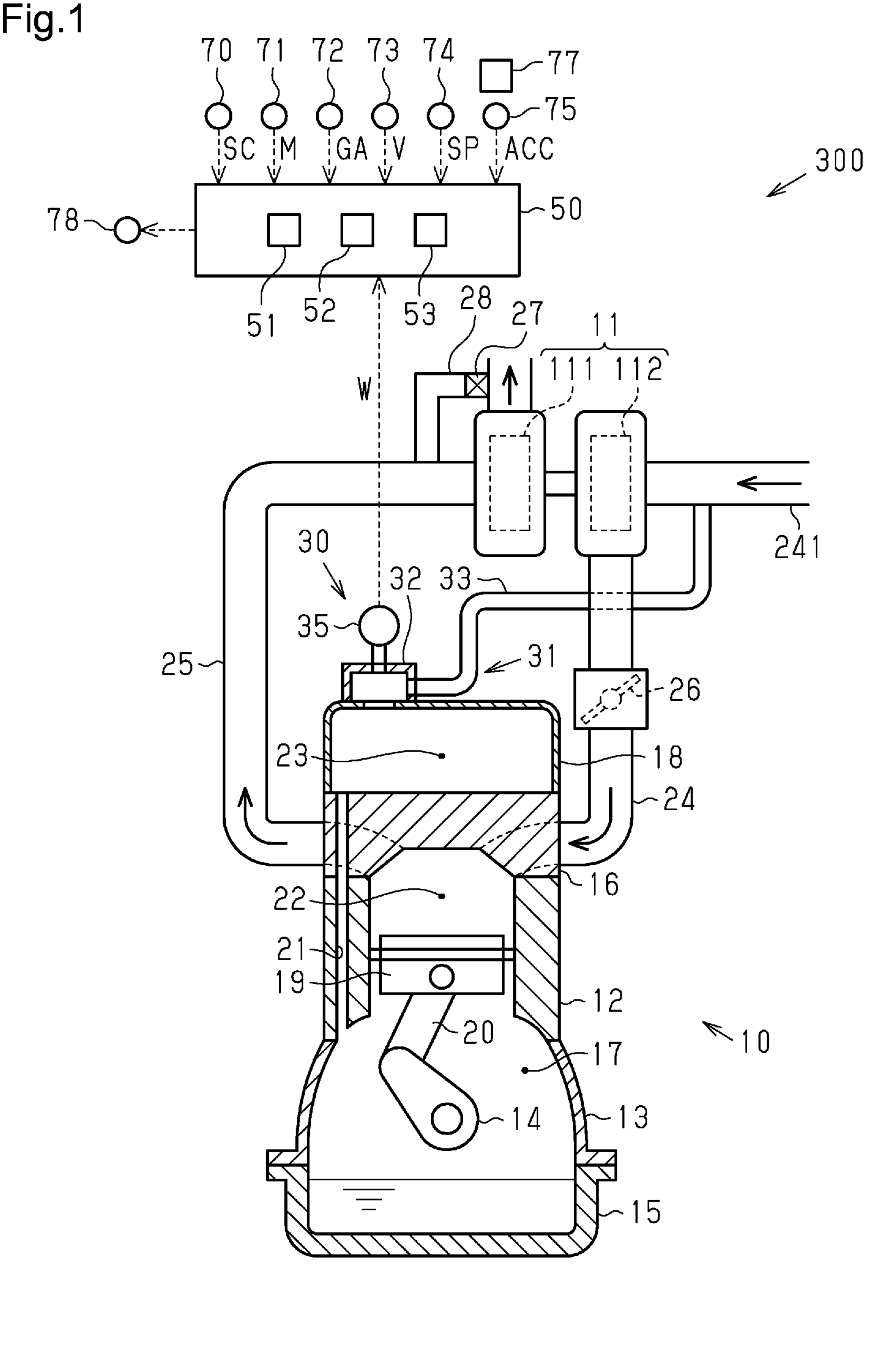
FIG. 1 is a schematic diagram showing a configuration of an internal combustion engine.

As shown in FIG. 1, a vehicle 300 includes an internal combustion engine 10. The internal combustion engine 10 is a drive source of the vehicle 300. The internal combustion engine 10 is a vehicle-mounted internal combustion engine.

The internal combustion engine 10 includes a cylinder block 12, a crankcase 13, an oil pan 15, and a crankshaft 14. The crankcase 13 is located below the cylinder block 12. The crankcase 13 is attached to the cylinder block 12. The crankcase 13 includes a crank chamber 17. The crank chamber 17 is a space defined inside the crankcase 13. The crank chamber 17 accommodates the crankshaft 14. The oil pan 15 is located below the crankcase 13. The oil pan 15 is attached to the crankcase 13. The oil pan 15 stores oil for lubrication.

The internal combustion engine 10 includes cylinders 22, pistons 19, and connecting rods 20. FIG. 1 illustrates only one of the cylinders 22. The same applies to the pistons 19 and the connecting rods 20. Each cylinder 22 is a space defined inside the cylinder block 12. Mixture of fuel and intake air is burned in the cylinders 22. The cylinders 22 are connected to the crank chamber 17. The pistons 19 are located in the respective cylinders 22. The pistons 19 reciprocate in the respective cylinders 22. The pistons 19 are connected to the crankshaft 14 with the connecting rods 20. The crankshaft 14 rotates in response to operation of the pistons 19.

The internal combustion engine 10 includes a cylinder head 16 and a head cover 18. The cylinder head 16 is located above the cylinder block 12. The cylinder head 16 is attached to the cylinder block 12. The head cover 18 is located above the cylinder head 16. The head cover 18 is attached to the cylinder head 16.

The internal combustion engine 10 includes an intake passage 24 and an exhaust passage 25. The intake passage 24 conducts intake air to the cylinders 22. The intake passage 24 is connected to the cylinders 22. A downstream portion of the intake passage 24 is formed as intake ports defined in the cylinder head 16. The exhaust passage 25 discharges exhaust gas from the cylinders 22. The exhaust passage 25 is connected to the cylinders 22. An upstream portion of the exhaust passage 25 is formed as exhaust ports defined in the cylinder head 16.

The internal combustion engine 10 includes a throttle valve 26, an exhaust-driven forced-induction device 11, a bypass passage 28, and a wastegate valve (hereinafter, referred to as WGV) 27. The throttle valve 26 is located in the middle of the intake passage 24. The opening degree of the throttle valve 26 can be adjusted. An intake air amount GA changes in accordance with the opening degree of the throttle valve 26. The forced-induction device 11 includes a compressor wheel 112 and a turbine wheel 111. The compressor wheel 112 is located upstream of the throttle valve 26 in the intake passage 24. The turbine wheel 111 is located in the middle of the exhaust passage 25. The bypass passage 28 is connected to sections of the exhaust passage 25 that are on the upstream side and the downstream side of the turbine wheel 111. The WGV 27 is located at the downstream end of the bypass passage 28. The opening degree of the WGV 27 can be adjusted. The amount of exhaust gas flowing through the bypass passage 28 changes in accordance with the opening degree of the WGV 27. When the WGV 27 has an opening degree smaller than the fully open state, the amount of exhaust gas passing through the turbine wheel 111 increases. Then, the turbine wheel 111 rotates in response to the flow of the exhaust gas. At this time, the compressor wheel 112 rotates integrally with the turbine wheel 111. The compressor wheel 112 compresses and delivers the intake air. That is, the internal combustion engine 10 is supercharged with the intake air.

The internal combustion engine 10 includes a blow-by gas treatment mechanism 30 for returning blow-by gas in the crank chamber 17 to the intake passage 24. The blow-by gas is a combustion gas leaking from the cylinders 22 to the crank chamber 17. The blow-by gas treatment mechanism 30 includes a connecting passage 21, an accumulation space 23, a joint 32, and a blow-by gas pipe 33. The accumulation space 23 is a space defined by the cylinder head 16 and the head cover 18. The connecting passage 21 extends through the cylinder block 12 and the cylinder head 16. The connecting passage 21 connects the crank chamber 17 to the accumulation space 23. The joint 32 is attached to the head cover 18. One end of the blow-by gas pipe 33 is connected to the joint 32. The blow-by gas pipe 33 is connected to the accumulation space 23 via the joint 32. The other end of the blow-by gas pipe 33 is connected to an upstream intake passage 241, which is a portion of the intake passage 24 that is upstream of the compressor wheel 112. The connecting passage 21, the accumulation space 23, the joint 32, and the blow-by gas pipe 33 form a blow-by gas passage 31. That is, the blow-by gas passage 31 connects the crank chamber 17 to the upstream intake passage 241. In the blow-by gas passage 31, blow-by gas in the crank chamber 17 reaches the accumulation space 23 through the connecting passage 21. The accumulation space 23 temporarily accumulates blow-by gas. The blow-by gas in the accumulation space 23 reaches the upstream intake passage 241 through the blow-by gas pipe 33.

The internal combustion engine 10 includes a positive crankcase ventilation (PCV) pressure sensor 35, a crank position sensor 70, an atmospheric pressure sensor 71, an air flow meter 72, and a voltage sensor 73. The PCV pressure sensor 35 is installed in the joint 32. The PCV pressure sensor 35 detects the absolute pressure in the joint 32. The pressure in the joint 32 is equal to the pressure in the blow-by gas pipe 33. The PCV pressure sensor 35 thus detects a PCV pressure W, which is the pressure in the blow-by gas pipe 33. The crank position sensor 70 detects a rotational position SC of the crankshaft 14. The atmospheric pressure sensor 71 detects an atmospheric pressure M, which is a pressure around the internal combustion engine 10. The air flow meter 72 is located upstream of the compressor wheel 112 in the intake passage 24. The air flow meter 72 detects the intake air amount GA. The voltage sensor 73 detects a battery voltage V, which is a voltage of a battery of the vehicle 300. Each of these sensors repeatedly outputs a signal corresponding to the detected information to a diagnosing apparatus 50, which will be discussed below.

The vehicle 300 includes an accelerator pedal 77, an accelerator sensor 75, a vehicle speed sensor 74, and a notification lamp 78. The accelerator pedal 77 is a foot pedal depressed by an occupant. The accelerator sensor 75 detects a depression amount of the accelerator pedal 77 as an accelerator operation amount ACC. The vehicle speed sensor 74 detects the traveling speed of the vehicle 300 as a vehicle speed SP. The accelerator sensor 75 and the vehicle speed sensor 74 repeatedly output signals corresponding to detected information to the diagnosing apparatus 50, which will be discussed below. The notification lamp 78 is located in the passenger compartment of the vehicle 300. The notification lamp 78 notifies occupants of an anomaly of the blow-by gas pipe 33.

<Anomaly Diagnosing Apparatus>

The vehicle 300 is provided with the anomaly diagnosing apparatus (hereinafter, simply referred to as a diagnosing apparatus) 50 for the internal combustion engine 10. The diagnosing apparatus 50 may include one or more processors that execute various processes according to computer programs (software). The diagnosing apparatus 50 may be circuitry including one or more dedicated hardware circuits such as application specific integrated circuits (ASICs) that execute at least part of various processes, or a combination thereof. The processor includes a CPU 51 and a memory 52 such as a RAM and a ROM. The memory 52 stores program codes or instructions configured to cause the CPU 51 to execute processes. The memory 52, which is a computer-readable medium, includes any type of media that are accessible by general-purpose computers and dedicated computers. The diagnosing apparatus 50 also includes a storage device 53, which is a nonvolatile memory that can be electrically rewritten.

The diagnosing apparatus 50 repeatedly receives detection signals output from the above-described sensors in the vehicle 300. The diagnosing apparatus 50 diagnoses the state of the internal combustion engine 10 based on the detection signals. In addition, the diagnosing apparatus 50 controls various parts of the internal combustion engine 10. For example, the diagnosing apparatus 50 calculates the engine rotation speed based on the rotational position SC of the crankshaft 14. Then, the diagnosing apparatus 50 calculates a requested load factor, which is a requested value of the engine load factor, based on the engine rotation speed, the accelerator operation amount ACC, and the like. Then, the diagnosing apparatus 50 controls the throttle valve 26 so as to obtain the intake air amount GA that achieves the requested load factor. When the requested load factor is relatively high, the diagnosing apparatus 50 sets the WGV 27 to an opening degree smaller than the full opening. As a result, the forced-induction device 11 performs supercharging. The diagnosing apparatus 50 causes the forced-induction device 11 to perform supercharging in a situation in which the intake air amount GA is relatively large. The engine load factor is a parameter that determines the amount of air with which the cylinders 22 are charged. The engine load factor is obtained by dividing the amount of air flowing into one cylinder 22 per combustion cycle by a reference air amount. The reference air amount changes in accordance with the engine rotation speed.

<Anomaly of Blow-By Gas Pipe>

The diagnosing apparatus 50 is capable of executing a diagnosis process for diagnosing whether an anomaly has occurred in the blow-by gas pipe 33. The anomaly to be diagnosed in the diagnosis process is an anomaly in which blow-by gas leaks from the blow-by gas pipe 33 to the outside (hereinafter, referred to as a leakage anomaly). The leakage anomaly of the blow-by gas pipe 33 occurs when one end of the blow-by gas pipe 33 is detached from the joint 32, when the other end of the blow-by gas pipe 33 is detached from the upstream intake passage 241, or when the blow-by gas pipe 33 is broken.

The leakage anomaly can be classified into the following two types in terms of the degree of the leakage amount of blow-by gas. One of the types is that the interior of the blow-by gas pipe 33 is completely exposed to the atmosphere when the blow-by gas pipe 33 is completely detached from the joint 32 or the upstream intake passage 241, or when the blow-by gas pipe 33 is damaged to have a considerably large opening area. Hereinafter, a state in which the interior of the blow-by gas pipe 33 is completely exposed to the atmosphere will be referred to as a complete exposure state. When the leakage anomaly occurs in the type of the complete exposure state, the leakage amount of the blow-by gas increases. The other type is that the interior of the blow-by gas pipe 33 is slightly exposed to the atmosphere due to the occurrence of breakage having a small opening area in the blow-by gas pipe 33. Hereinafter, a state in which the interior of the blow-by gas pipe 33 is slightly exposed to the atmosphere will be referred to as a partial exposure state. The leakage anomaly of this type may also occur when the connection between the blow-by gas pipe 33 and the joint 32 is slightly loosened or when the connection between the blow-by gas pipe 33 and the intake passage 24 is loosened slightly. When there is a leakage anomaly of the partial exposure state, the leakage amount of the blow-by gas is not significantly large.

In the diagnosis process, the diagnosing apparatus 50 uses the PCV pressure W to diagnose whether there is a leakage anomaly. The relationship between the intake air amount GA and the PCV pressure W will now be described. The relationship is the basis for the use of the PCV pressure Win the diagnosis process, which is executed by the diagnosing apparatus 50. First, the relationship between the intake air amount GA and the PCV pressure W in a case in which the blow-by gas pipe 33 is normal will be described. When supercharging is performed by the forced-induction device 11, that is, when the intake air amount GA is relatively large, a negative pressure is generated in the upstream intake passage 241. Accordingly, the blow-by gas in the blow-by gas passage 31 flows into the upstream intake passage 241. This causes the PCV pressure W to be lower than the atmospheric pressure M. The amount of blow-by gas flowing into the upstream intake passage 241 increases as the intake air amount GA increases because the negative pressure in the upstream intake passage 241 increases. That is, as shown by the solid line in FIG. 2, the PCV pressure W decreases as the intake air amount GA increases.

In contrast, the relationship between the intake air amount GA and the PCV pressure W when there is a leakage anomaly in the blow-by gas pipe 33 is as follows. First, the case of the complete exposure state will be described. When the blow-by gas pipe 33 is in the complete exposure state, the interior of the blow-by gas pipe 33 is completely open to the atmosphere. Therefore, in this case, as indicated by the long-dash short-dash line in FIG. 2, the PCV pressure W has a value near the atmospheric pressure M regardless of the intake air amount GA.

Next, the case of the above-described partial exposure state will be described. As described above, when the blow-by gas pipe 33 is brought into the partial exposure state, the cause thereof is mainly breakage of the blow-by gas pipe 33 in many cases. Although depending on the opening area of the breakage, the following occurs in the case of the partial exposure state, unlike the case of the complete exposure state. When a negative pressure is generated in the upstream intake passage 241 due to supercharging by the forced-induction device 11, a certain amount of blow-by gas flows into the upstream intake passage 241. Therefore, the PCV pressure W becomes lower than the atmospheric pressure M. The amount of blow-by gas flowing into the upstream intake passage 241 increases as the intake air amount GA increases because the negative pressure in the upstream intake passage 241 increases. That is, as shown by the broken line in FIG. 2, the PCV pressure W decreases as the intake air amount GA increases. However, since the interior of the blow-by gas pipe 33 is exposed to the atmosphere via the damaged portion, the PCV pressure W is closer to the atmospheric pressure M than in a case in which the blow-by gas pipe 33 is normal.

Aside from the leakage anomaly described above, a clogging anomaly may occur in the blow-by gas pipe 33. The clogging anomaly means that clogging occurs in the blow-by gas pipe 33. When a clogging anomaly occurs, the blow-by gas accumulated in the accumulation space 23 cannot flow into the upstream intake passage 241 via the blow-by gas passage 31. On the other hand, when the internal combustion engine 10 is operating, blow-by gas continues to be generated. The generation amount of blow-by gas tends to increase as the intake air amount GA increases. Therefore, as indicated by the long-dash double-short-dash line in FIG. 2, the PCV pressure W is higher than the atmospheric pressure M when the intake air amount GA is relatively large.

<Outline of Diagnosis Process>

The diagnosing apparatus 50 is capable of executing a first process as part of the diagnosis process. In the first process, the diagnosing apparatus 50 calculates a pressure fluctuation amount WA, which is a fluctuation amount of the PCV pressure W in a specific period H. The specific nature of the pressure fluctuation amount WA will be discussed below. The specific period H is a period during which an intake air fluctuation amount AGA, which is a fluctuation amount of the intake air amount GA per unit time, is greater than or equal to a specified value K. The specific nature of the intake air fluctuation amount AGA will be discussed below. In the present embodiment, the diagnosing apparatus 50 executes the first process while the intake air amount GA is increasing. In this case, the fluctuation amount per unit time of the intake air amount GA is the amount of increase per unit time of the intake air amount GA. The diagnosing apparatus 50 executes the first process only when the intake air amount GA is greater than or equal to a determination air amount GATh.

The diagnosing apparatus 50 is capable of executing a second process as part of the diagnosis process. In the second process, the diagnosing apparatus 50 corrects the pressure fluctuation amount WA to a value that is less affected by the intake air fluctuation amount AGA. Specifically, when correcting the same pressure fluctuation amount WA is corrected, the diagnosing apparatus 50 corrects the pressure fluctuation amount WA to a smaller value when the intake air fluctuation amount AGA in the specific period H is relatively large than when the intake air fluctuation amount AGA is relatively small. Specifically, the diagnosing apparatus 50 divides the pressure fluctuation amount WA by the intake air fluctuation amount AGA. The diagnosing apparatus 50 uses the corrected pressure fluctuation amount WA as a determination parameter Y.

The diagnosing apparatus 50 is capable of executing a third process as part of the diagnosis process. In the third process, the diagnosing apparatus 50 determines whether there is a leakage anomaly in the blow-by gas pipe 33 based on the determination parameter Y. The diagnosing apparatus 50 repeatedly executes the first process and the second process described above for different specific periods H. Thus, the diagnosing apparatus 50 calculates the determination parameter Y multiple times. Specifically, the diagnosing apparatus 50 calculates the determination parameter Y a certain number of times, the number being represented by NTh (determination number of times NTh). In the third process, the diagnosing apparatus 50 determines that a leakage anomaly is occurring if a cumulative parameter Z, which is a cumulative value of the determination parameter Y calculated a certain number of times, is less than a determination threshold ZTh.

Figure 2:
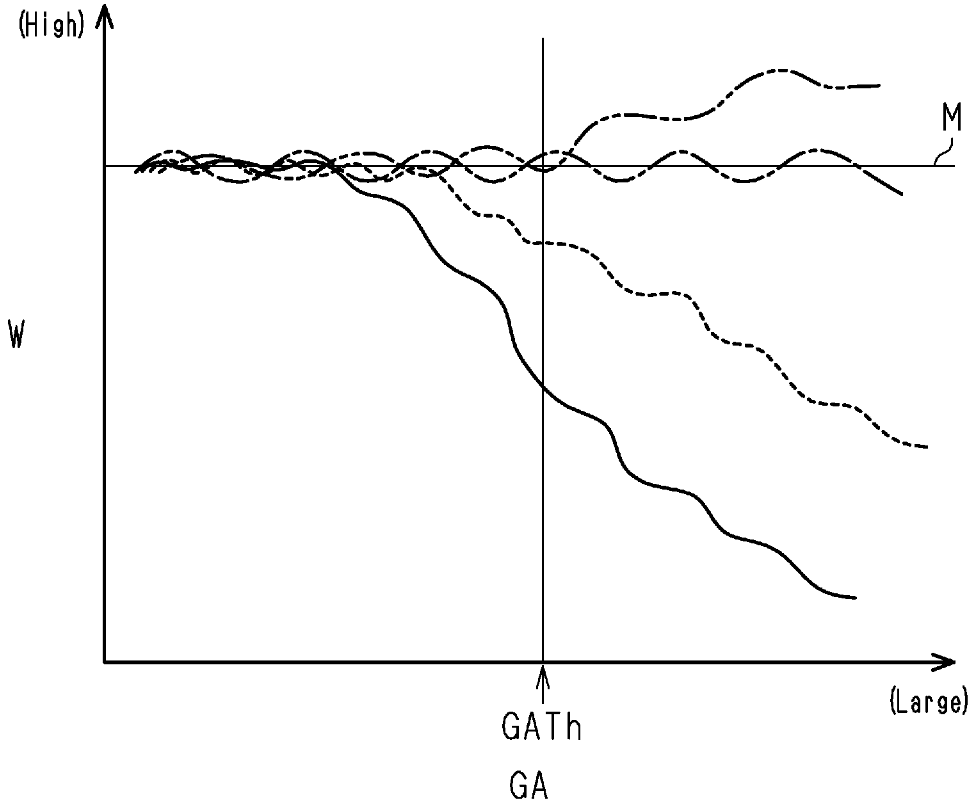
FIG. 2 is a diagram showing a relationship between an intake air amount and a PCV pressure.

The diagnosing apparatus 50 stores in advance the determination air amount GATh as information necessary for executing the diagnosis process. As described above, when the intake air amount GA is relatively small, a difference in the PCV pressure W is unlikely to occur between when a leakage anomaly occurs in the blow-by gas pipe 33 and when the blow-by gas pipe 33 is normal. In this regard, the determination air amount GATh is determined based on, for example, experiments or simulations as a value at which there is a clear difference in the PCV pressure W between a state in which a leakage anomaly is occurring and a normal state. The determination air amount GATh is greater than or equal to the minimum value of the intake air amount GA during supercharging performed by the forced-induction device 11. That is, the fact that the intake air amount GA is greater than or equal to the determination air amount GATh indicates a situation in which a negative pressure is generated in the upstream intake passage 241. FIG. 2 shows an example of the determination air amount GATh.

The diagnosing apparatus 50 stores the unit time in advance as information necessary for executing the diagnosis process. The unit time is a fairly short length of less than one second, for example, 0.1 seconds. The unit time is determined based on, for example, experiments or simulations as a length of time within which the rising process of the intake air amount GA accompanying acceleration of the vehicle 300 can be extracted in the transition of the intake air amount GA. The unit time is sufficiently longer than the data sampling interval of the sensor used in the diagnosis process. Therefore, the sensor outputs multiple detection signals to the diagnosing apparatus 50 within a unit time.

Figure 3:
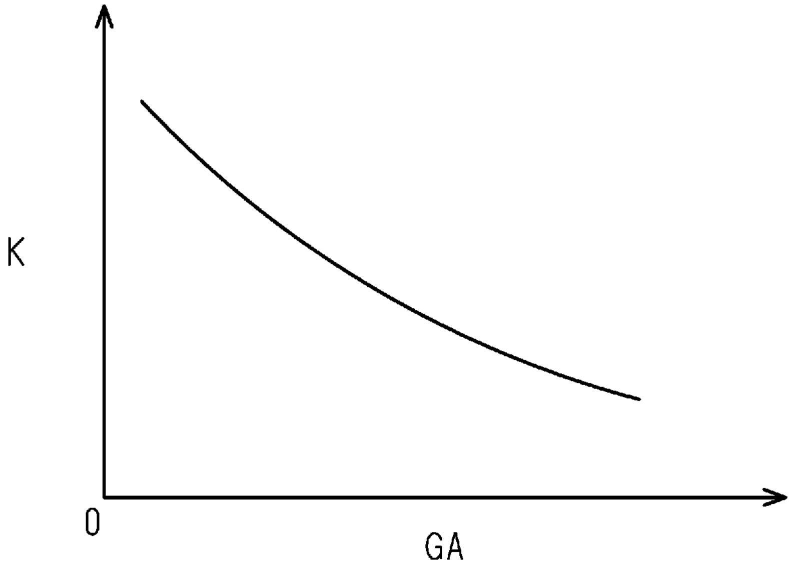
FIG. 3 is a diagram showing a relationship between the intake air amount and a specified value.

The diagnosing apparatus 50 stores in advance a specified value map as information necessary for executing the diagnosis process. The specified value map represents the relationship between the intake air amount GA and the specified value K. The specified value K for each intake air amount GA is the value described below. Among the values of the intake air fluctuation amount AGA that ca occur in the internal combustion engine 10, the specified value K is not a momentary noise, but is a value that allows for determination that the vehicle 300 is accelerating with the forced-induction device 11 performing supercharging. The specified value K is also a value with which there is a clear difference in the pressure fluctuation amount WA between a state in which a leakage anomaly is occurring and a normal state. In association with the above-described relationship between the intake air amount GA and the PCV pressure W, the following can be said. In a situation in which the intake air amount GA is small and the negative pressure in the upstream intake passage 241 is small even during supercharging, a difference in the pressure fluctuation amount WA between the leakage anomaly of the partial exposure state and the normal state is unlikely to occur unless the intake air fluctuation amount AGA becomes large to some extent. Taking this into consideration, in the specified value map, the specified value K is set such that the specified value K increases as the intake air amount GA decreases, as shown in FIG. 3. The specified value map is created based on, for example, experiments or simulations. In this way, the specified value K is determined in advance in correspondence with the intake air amount GA.

The diagnosing apparatus 50 stores in advance the determination number of times NTh as information necessary for executing the diagnosis process. The determination number of times NTh is determined as the minimum value of the number of determination parameters Y necessary for obtaining an accurate diagnosis result. For example, the determination number of times NTh is determined based on experiments or simulations.

The diagnosing apparatus 50 stores in advance the determination threshold ZTh as information necessary for executing the diagnosis process. The determination threshold ZTh is determined based on, for example, experiments or simulations as the minimum value among the possible values of the cumulative parameter Z when the blow-by gas pipe 33 is normal. The determination threshold ZTh is a value based on the determination number of times NTh.

<Specific Procedure of Diagnosis Process>

During operation of the internal combustion engine 10, the diagnosing apparatus 50 repeatedly executes the diagnosis process. When executing the diagnosis process for the first time after the internal combustion engine 10 is started, the diagnosing apparatus 50 executes a reset process, which is the same as step S34 discussed below, before the start of the diagnosis process. Then, the diagnosing apparatus 50 starts the diagnosis process. Therefore, at the start of the first diagnosis process after the start of the internal combustion engine 10, the cumulative parameter Z and the number of times of cumulative operation (cumulative number of times N) are 0.

Figure 4:
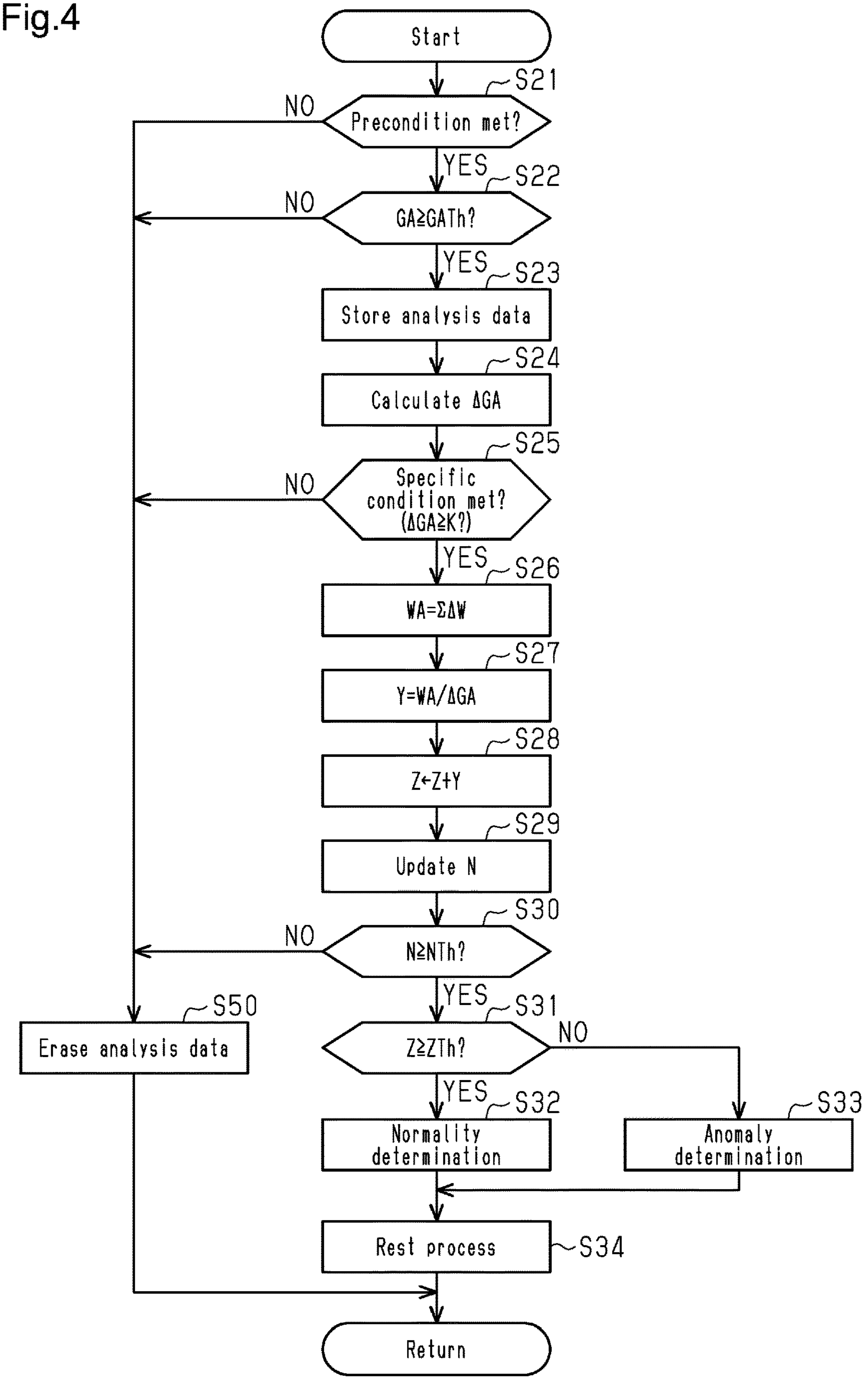
FIG. 4 is a flowchart showing a procedure of a diagnosis process.

As shown in FIG. 4, when starting the diagnosis process, the diagnosing apparatus 50 first executes the process of step S21. In step S21, the diagnosing apparatus 50 determines whether a precondition is met. The precondition is that both of the following two items are satisfied. The first item is that the state in which the PCV pressure W is higher than the atmospheric pressure M has not been continuing in the history of the PCV pressure W received from the PCV pressure sensor 35. The second item is that the latest battery voltage V received from the voltage sensor 73 is greater than or equal to a determination voltage VTh. Regarding the first item, if the state in which the PCV pressure W is higher than the atmospheric pressure M has been continuing, a clogging anomaly may be occurring. The first item is for eliminating such a situation. The period during which the history of the PCV pressure W is checked is determined in advance by, for example, experiments or simulations as the length of time in which a clogging anomaly is assumed to have occurred. Regarding the second item, when the battery voltage V is lower than the determination voltage VTh, there is a possibility that a necessary voltage cannot be applied to the sensors used for diagnosis. The diagnosing apparatus 50 determines whether the precondition is met by referring to the history of the PCV pressure W received from the PCV pressure sensor 35, the atmospheric pressure M received from the atmospheric pressure sensor 71, and the battery voltage V received from the voltage sensor 73. When the precondition is not met (step S21: NO), the diagnosing apparatus 50 advances the process to step S50.

In step S50, the diagnosing apparatus 50 erases data for analysis. When the determination in step S21 is NO and the process proceeds to step S50, the diagnosing apparatus 50 does not store analysis data after the start of the diagnosis process. Therefore, the diagnosing apparatus 50 does substantially nothing in this case. The same applies to a case in which the determination in step S22, which will be discussed below, is NO and the process proceeds to step S50. After executing the process of step S50, the diagnosing apparatus 50 temporarily ends the series of processes of the diagnosis process. Thereafter, the diagnosing apparatus 50 executes the process of step S21 again.

If the precondition is met in step S21 (step S21: YES), the diagnosing apparatus 50 advances the process to step S22.

In step S22, the diagnosing apparatus 50 determines whether the intake air amount GA is greater than or equal to the determination air amount GATh. The diagnosing apparatus 50 refers to the latest intake air amount GA received from the air flow meter 72 and the determination air amount GATh. When the latest intake air amount GA is less than the determination air amount GATh (step S22: NO), the diagnosing apparatus 50 advances the process to step S50. If the latest intake air amount GA is greater than or equal to the determination air amount GATh (step S22: YES), the diagnosing apparatus 50 advances the process to step S23. An example of a situation in which the process proceeds to step S23 is a situation in which the intake air amount GA increases from a value less than the determination air amount GATh to a value greater than or equal to the determination air amount GATh while the intake air amount GA is increasing. The increasing process of the intake air amount GA is thus detected.

In step S23, the diagnosing apparatus 50 stores the analysis data over the unit time. Specifically, the diagnosing apparatus 50 stores, in time series, multiple values of the intake air amount GA received from the air flow meter 72 during a period from when the process proceeds to step S23 until the unit time elapses. The diagnosing apparatus 50 uses this time-series data as first data for analysis (first analysis data D1). In addition, the diagnosing apparatus 50 stores, in time series, multiple values of the PCV pressure W received from the PCV pressure sensor 35 during a period from when the process proceeds to step S23 until the unit time elapses. The diagnosing apparatus 50 uses this time-series data as second data for analysis (second analysis data D2). The diagnosing apparatus 50 may store the analysis data in the RAM or in the storage device 53. The same applies to other parameters used in the diagnosis process. The diagnosing apparatus 50 may measure the unit time by counting up a counter for time measurement, for example. When the unit time has elapsed after the process proceeds to step S23, the diagnosing apparatus 50 advances the process to step S24.

In step S24, the diagnosing apparatus 50 calculates the intake air fluctuation amount ΔGA. Specifically, the diagnosing apparatus 50 refers to the first analysis data D1 stored in step S23. Then, the diagnosing apparatus 50 specifies the first intake air amount GA in the time series of the first analysis data D1 as a starting air amount. Also, the diagnosing apparatus 50 specifies the last intake air amount GA in the time series of the first analysis data D1 as an ending air amount. Then, the diagnosing apparatus 50 calculates a value obtained by subtracting the starting air amount from the ending air amount as the intake air fluctuation amount ΔGA. That is, the diagnosing apparatus 50 of the present embodiment does not divide the value obtained by subtracting the starting air amount from the ending air amount by the unit time, but uses the obtained difference as the intake air fluctuation amount ΔGA. Thereafter, the diagnosing apparatus 50 advances the process to step S25.

In step S25, the diagnosing apparatus 50 determines whether a specific condition is met. The specific condition is that both of following items (A) and (B) are met.

(A) The intake air fluctuation amount ΔGA calculated in step S24 is greater than or equal to the specified value K.

(B) The starting air amount used in the calculation of the intake air fluctuation amount ΔGA in step S24 is the minimum value in the time series of the first analysis data D1, and the ending air amount is the maximum value in the time series of the first analysis data D1.

When determining whether the item (A) is met, the diagnosing apparatus 50 first refers to the specified value map. Then, the diagnosing apparatus 50 calculates the specified value K that corresponds to the starting air amount based on the specified value map. Then, the diagnosing apparatus 50 compares the specified value K with the intake air fluctuation amount ΔGA to determine whether the relationship specified in the item (A) is satisfied. When determining whether the item (B) is met, the diagnosing apparatus 50 compares each value of the intake air amount GA in the time series of the first analysis data D1 with the starting air amount and compares each value of the intake air amount GA with the ending air amount. Accordingly, the diagnosing apparatus 50 determines whether the relationship specified in the item (B) is satisfied. If the specific condition is not met (step S25: NO), the diagnosing apparatus 50 advances the process to step S50. If the specific condition is met (step S25: YES), the diagnosing apparatus 50 specifies a series of periods in which the analysis data is stored in step S23 as the specific period H. Thereafter, the diagnosing apparatus 50 advances the process to step S26. The determination of YES in step S25 means that the intake air amount GA continues to increase with the passage of time in the time series of the first analysis data D1. As described above, in a situation in which the intake air amount GA is relatively large (step S22: YES), the PCV pressure W decreases as the intake air amount GA increases. Due to this relationship between the intake air amount GA and the PCV pressure W, if the intake air amount GA continues to increase in the time series of the first analysis data D1, the PCV pressure W continues to decrease with time in the time series of the second analysis data D2.

In step S26, the diagnosing apparatus 50 calculates the pressure fluctuation amount WA. Specifically, the diagnosing apparatus 50 refers to the second analysis data D2, which is time-series data of the PCV pressures W. Then, the diagnosing apparatus 50 specifies the first value of the PCV pressure W in the time series of the second analysis data D2 as a reference pressure. Next, the diagnosing apparatus 50 calculates differences between the reference pressure and the respective values of the PCV pressure W (hereinafter, referred to as data elements), which form the time-series data of the second analysis data D2. That is, the diagnosing apparatus 50 calculates, for each data element, a value obtained by subtracting the data element from the reference pressure as a pressure difference value ΔW. Then, the diagnosing apparatus 50 calculates a value obtained by accumulating all the values of the pressure difference value ΔW as the pressure fluctuation amount WA. As described above, in a situation in which the process proceeds to step S26, the PCV pressure W continues to decrease in the time series of the second analysis data D2. Therefore, the value of each data element is basically less than the value of the reference pressure. However, due to noise or the like, the value of a data element may be greater than the value of the reference pressure. When the value of the data element is greater than the reference pressure, the diagnosing apparatus 50 calculates the pressure difference value ΔW as 0. After calculating the pressure fluctuation amount WA, the diagnosing apparatus 50 advances the process to step S27. The process of step S26 corresponds to the first process.

In step S27, the diagnosing apparatus 50 calculates the determination parameter Y. Specifically, the diagnosing apparatus 50 refers to the pressure fluctuation amount WA calculated in step S26 and the intake air fluctuation amount ΔGA calculated in step S24. Then, the diagnosing apparatus 50 divides the pressure fluctuation amount WA by the intake air fluctuation amount ΔGA. The diagnosing apparatus 50 sets the determination parameter Y to the obtained value. After calculating the determination parameter Y, the diagnosing apparatus 50 advances the process to step S28. The process of step S27 corresponds to the second process. According to the definition of the intake air fluctuation amount ΔGA described in step S24, the intake air fluctuation amount ΔGA is the difference between the minimum and maximum values of the intake air amount GA in the specific period H. That is, in the process of step S27, the diagnosing apparatus 50 divides the pressure fluctuation amount WA by the difference between the minimum and maximum values of the intake air amount GA in the specific period H.

In step S28, the diagnosing apparatus 50 updates the cumulative parameter Z. That is, the diagnosing apparatus 50 adds the determination parameter Y, which has been calculated in step S27, to the currently stored cumulative parameter Z. Then, the diagnosing apparatus 50 stores the obtained value as the latest cumulative parameter Z. Thereafter, the diagnosing apparatus 50 advances the process to step S29.

In step S29, the diagnosing apparatus 50 updates the cumulative number of times N. That is, the diagnosing apparatus 50 adds 1 to the currently stored cumulative number of times N. Then, the diagnosing apparatus 50 stores the obtained value as the latest cumulative number of times N. Thereafter, the diagnosing apparatus 50 advances the process to step S30.

In step S30, the diagnosing apparatus 50 determines whether the cumulative number of times N, which has been updated in step S30, is greater than or equal to the determination number of times NTh. When the cumulative number of times N updated in step S30 is less than the determination number of times NTh (step S30: NO), the diagnosing apparatus 50 advances the process to step S50.

If the cumulative number of times N is greater than or equal to the determination number of times NTh in step S30 (step S30: YES), the diagnosing apparatus 50 advances the process to step S31.

In step S31, the diagnosing apparatus 50 determines whether the cumulative parameter Z, which has been updated in step S28, is greater than or equal to the determination threshold ZTh. If the cumulative parameter Z is greater than or equal to the determination threshold ZTh (step S31: YES), the diagnosing apparatus 50 advances the process to step S32. In this case, the diagnosing apparatus 50 determines that the blow-by gas pipe 33 is normal in step S32. For example, the diagnosing apparatus 50 turns off a leakage flag, which indicates whether there is a leakage anomaly. Thereafter, the diagnosing apparatus 50 advances the process to step S34. The diagnosing apparatus 50 uses the information on the ON/OFF of the leakage flag as one piece of information for controlling the internal combustion engine 10, for example.

If the cumulative parameter Z is less than the determination threshold ZTh in step S31 (step S31: NO), the diagnosing apparatus 50 advances the process to step S33. In this case, the diagnosing apparatus 50 determines in step S33 that there is a leakage anomaly in the blow-by gas pipe 33. The diagnosing apparatus 50 turns ON the leakage flag, for example. Further, the diagnosing apparatus 50 turns on the notification lamp 78. Thereafter, the diagnosing apparatus 50 advances the process to step S34. As described above, the diagnosing apparatus 50 obtains the diagnostic result on whether there is an anomaly of the blow-by gas passage 31 through the processes of step S31, step S32, and step S33. The processes of step S31, step S32, and step S33 correspond to the third process.

In step S34, the diagnosing apparatus 50 executes a reset process. That is, the diagnosing apparatus 50 resets the cumulative number of times N and the cumulative parameter Z to 0. Further, the diagnosing apparatus 50 deletes the analysis data. Subsequently, the diagnosing apparatus 50 temporarily ends the series of processes of the diagnosis process. Thereafter, the diagnosing apparatus 50 executes the process of step S21 again. In a case in which the notification lamp 78 is turned on in step S33, the diagnosing apparatus 50 continues to turn on the notification lamp 78 until, for example, a turn-off command of the notification lamp 78 is received in response to an operation by the occupant.

<Operation of Embodiment>

(A) Overall Flow of Diagnosis Process

The overall flow of the diagnosis process will be described by taking a case in which the blow-by gas pipe 33 is normal as an example. A case will be discussed in which the vehicle 300 is accelerating. Accordingly, the intake air amount GA is increasing with supercharging by the forced-induction device 11. As shown in part (a) of FIG. 5, the intake air fluctuation amount ΔGA reaches the determination air amount GATh at point in time t1 as the intake air amount GA increases (step S22: YES). Then, the diagnosing apparatus 50 stores the analysis data over the unit time (step S23). If the intake air fluctuation amount ΔGA in the unit time is greater than or equal to the specified value K (step S25: YES), the diagnosing apparatus 50 specifies a period corresponding to the unit time as a specific period (hereinafter, referred to as a first specific period) H1. As described above, when the forced-induction device 11 is performing supercharging, a change in the intake air amount GA and a change in the PCV pressure W are associated with each other. Therefore, when the intake air amount GA increases from a first air amount GA1 to a second air amount GA2 during the first specific period H1 as shown in part (a) of FIG. 5, the PCV pressure W decreases from a first pressure W1 to a second pressure W2 during the first specific period H1 as shown by the solid line in part (b) of FIG. 5. As an index of the degree of change in the PCV pressures W, the diagnosing apparatus 50 calculates the pressure fluctuation amount WA, which corresponds to the hatched area in part (b) of FIG. 5 (step S26). The diagnosing apparatus 50 updates the cumulative parameter Z by the determination parameter Y corresponding to the pressure fluctuation amount WA (step S28). That is, as indicated by the solid line in part (c) of FIG. 5, the cumulative parameter Z increases by one step at an ending point in time t2 of the first specific period H1.

Figure 5:
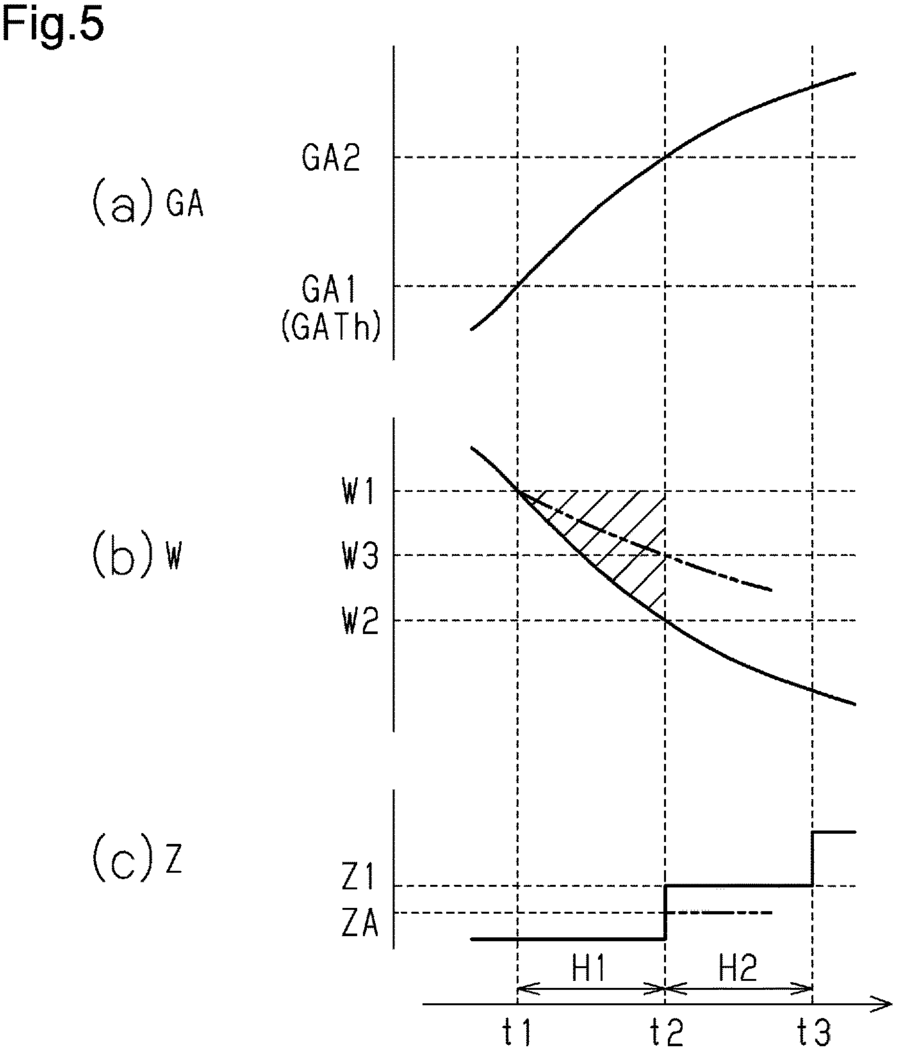
FIG. 5 is a timing diagram showing an example of changes in parameters related to the diagnosis process.

As shown in part (a) of FIG. 5, the intake air amount GA continues to increase even after the end of the first specific period H1. In this case, the diagnosing apparatus 50 specifies the unit time after the first specific period H1 as a second specific period H2. In the same manner as described above, the diagnosing apparatus 50 updates the cumulative parameter Z by the determination parameter Y corresponding to the pressure fluctuation amount WA. As indicated by the solid line in part (c) of FIG. 5, the cumulative parameter Z increases by one step at an ending point in time t3 of the second specific period H2. In this way, the cumulative parameter Z is increased sequentially.

In contrast to the above case, if there is a leakage in the blow-by gas pipe 33, the interior of the blow-by gas pipe 33 is exposed to the atmosphere. Therefore, a change in the PCV pressure W in response to a change in the intake air amount GA is small. It is now assumed that the first specific period H1 is reached when the blow-by gas pipe 33 is in the partial exposure state. It is also assumed that the intake air amount GA increases from the first air amount GA1 to the second air amount GA2. In this case, as indicated by the long-dash double-short-dash line in part (b) of FIG. 5, the PCV pressure W decreases from the first pressure W1 only to a third pressure W3, which is higher than the second pressure W2 within the first specific period H1. The pressure fluctuation amount WA at this time is smaller than the pressure fluctuation amount WA in the case in which the blow-by gas pipe 33 is normal. In this case, as indicated by the long-dash double-short-dash line in part (c) of FIG. 5, the cumulative parameter ZA at the ending point in time t2 of the first specific period H1 is smaller than the cumulative parameter Z1 in a case in which the blow-by gas pipe 33 is normal. As described above, when there is a leakage anomaly in the blow-by gas pipe 33, the pressure fluctuation amount WA and thus the cumulative parameter Z decrease. Using this point, the diagnosing apparatus 50 determines that there is a leakage anomaly in the blow-by gas pipe 33 (step S33) if the cumulative parameter Z is relatively small when the number of times of updates of the cumulative parameter Z reaches the determination number of times NTh (step S31: NO).

(B) Correction of Pressure Fluctuation Amount WA

The diagnosing apparatus 50 does not use the pressure fluctuation amount WA as the determination parameter Y, but uses a corrected value of the pressure fluctuation amount WA as the determination parameter Y. The significance of this correction will now be described. For the description, three different cases will be considered with respect to the intake air fluctuation amount ΔGA and the state of the blow-by gas pipe 33. A first case Q1 is a case in which the intake air amount GA has increased from the first air amount GA1 to the second air amount GA2 and the blow-by gas pipe 33 is normal, as in the first specific period H1. In the first case Q1, the PCV pressures W decrease from the first pressure W1 to the second pressure W2 as indicated by the solid line in part (b) of FIG. 5. For comparison with other cases discussed below, the same PCV pressure W as the solid line in part (b) of FIG. 5 is indicated by the long-dash short-dash line in part (b) of FIG. 8. Similarly, the same intake air amount GA as the solid line in part (a) of FIG. 5 is indicated by the long-dash short-dash line in part (a) of FIG. 8.

A second case Q2 is a case in which the intake air fluctuation amount ΔGA is significantly larger than that in the first case Q1, and the blow-by gas pipe 33 is normal. That is, as shown by the solid line in part (a) of FIG. 8, it is assumed that the intake air amount GA has increased from the first air amount GA1 to a third air amount GA3, which is larger than the second air amount GA2 in the first specific period H1. In this case, an intake air fluctuation amount ΔGAX is larger than an intake air fluctuation amount ΔGA1 in the first case Q1. The intake air fluctuation amount ΔGAX is the difference between the third air amount GA3, which is the intake air amount GA at the ending point in time t2 of the first specific period H1, and the first air amount GA1, which is the intake air amount at the starting point in time t1. In the second case Q2, as indicated by the long-dash double-short-dash line in part (b) of FIG. 8, the PCV pressure W decreases from the first pressure W1 to a fourth pressure W4, which is lower than the second pressure W2, during a period from the starting point in time t1 to the ending point in time t2 of the first specific period H1.

A third case Q3 is a case in which the intake air fluctuation amount ΔGA is the same as that in the second case Q2, and there is a leakage anomaly of the partial exposure state in the blow-by gas pipe 33. That is, as indicated by the solid line in part (a) of FIG. 8, the intake air amount GA increases from the first air amount GA1 to the third air amount GA3 in the first specific period H1, as in the second case Q2. In the third case Q3, since the blow-by gas pipe 33 is in the partial exposure state, the amount of decrease in the PCV pressure W in response to an increase in the intake air amount GA is smaller than that in the second case Q2, in which the blow-by gas pipe 33 is normal. That is, as indicated by the solid line in part (b) of FIG. 8, the PCV pressure W decreases from the first pressure W1 only to a fifth pressure W5, which is higher than the fourth pressure W4, during a period from the starting point in time t1 to the ending point in time t2 of the first specific period H1.

Figure 8:
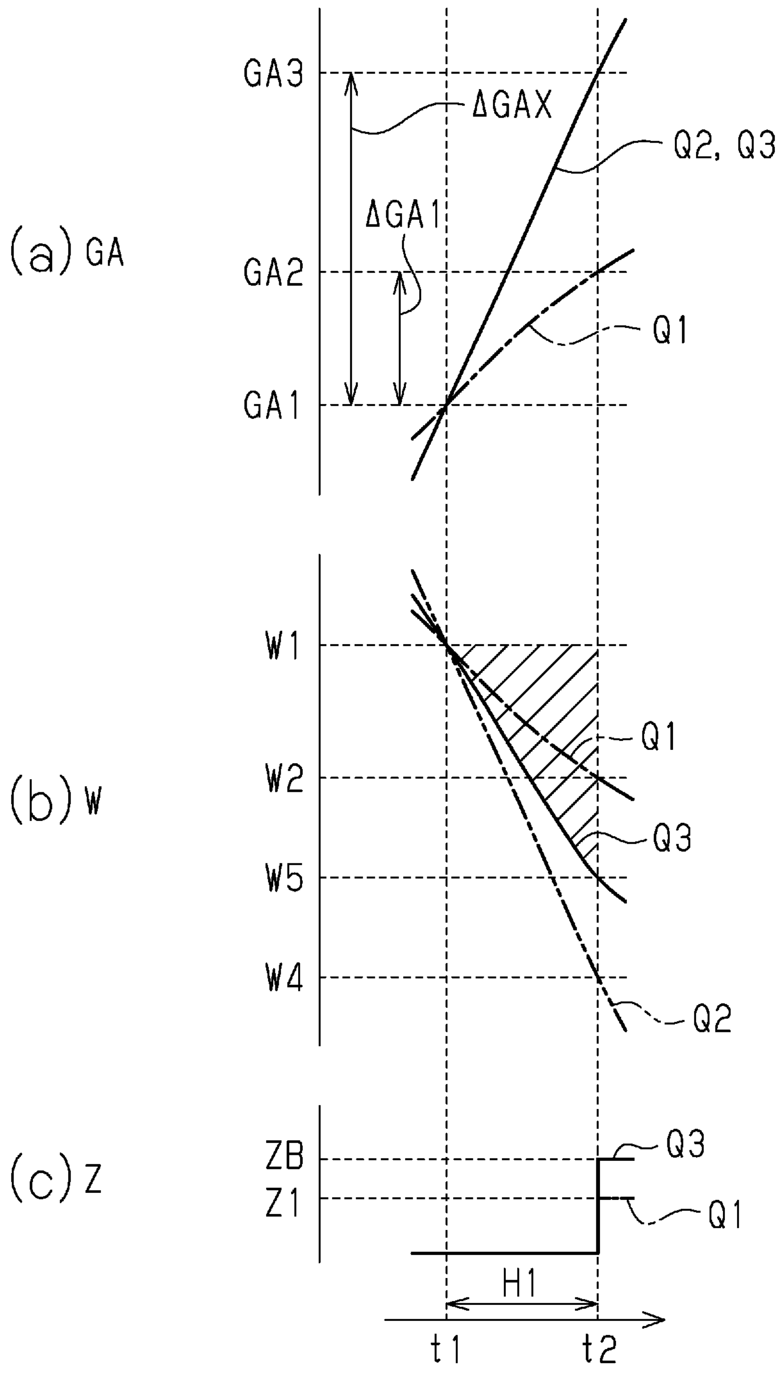
FIG. 8 is a timing diagram showing an example of differences of changes in parameters corresponding to differences in an intake air fluctuation amount.

As described above, the amount of decrease in the PCV pressures W in the first specific period H1 is smaller in the third case Q3 than in the second case Q2. However, since the intake air fluctuation amount ΔGAX in the third case Q3 is significantly large, the decrease amount of the PCV pressure W is correspondingly large. The amount of decrease in the PCV pressure W in the third case Q3 can be greater than the amount of decrease in the PCV pressure W, for example, in the first case Q1. That is, as shown in part (b) of FIG. 8, the fifth pressure W5, which is the PCV pressure at the ending point in time t2 of the first specific period H1 in the third case Q3, can be lower than the second pressure W2, which is the PCV pressure at the ending point in time t2 in the first case Q1. In this case, the pressure fluctuation amount WA in the third case Q3, which corresponds to the hatched area in part (b) of FIG. 8, is larger than the pressure fluctuation amount WA in the first case Q1, which corresponds to the hatched area in part (b) of FIG. 5. As described above, even when there is a leakage anomaly of the partial exposure state, if the intake air fluctuation amount ΔGAX is significantly large, the pressure fluctuation amount WA is larger than that in a case in which the intake air fluctuation amount ΔGA1 is small in a normal state.

It is now assumed that the pressure fluctuation amount WA as described above is used as the determination parameter Y without being corrected. In this case, as indicated by the solid line in part (c) of FIG. 8, a cumulative parameter ZB in the third case Q3 at the ending point in time t2 of the first specific period H1 is larger than the cumulative parameter Z1 in the first case Q1, which is indicated by the long-dash short-dash line in part (c) of FIG. 8. As described above, the diagnosis process determines that there is a leakage anomaly in the blow-by gas pipe 33 when the cumulative parameter Z is relatively small. Therefore, if the cumulative parameter Z is relatively large even though there is a leakage anomaly in the blow-by gas pipe 33 as in the third case Q3, it may be erroneously determined that the blow-by gas pipe 33 is normal.

Figure 6:
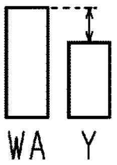
FIG. 6 is a schematic diagram showing an example of correction for a first case.
Figure 7:
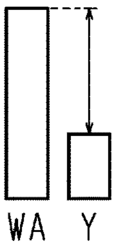
FIG. 7 is a schematic diagram showing an example of correction for a third case.

In order to avoid such a situation, the diagnosing apparatus 50 corrects the pressure fluctuation amount WA. Specifically, the diagnosing apparatus 50 divides the pressure fluctuation amount WA in the first specific period H1 by the intake air fluctuation amount ΔGA. The diagnosing apparatus 50 thus corrects the pressure fluctuation amount WA to a value that is less affected by the intake air fluctuation amount ΔGA. For example, in the first case Q1 described above, since the intake air fluctuation amount ΔGA1 is relatively small, the degree of change from the pressure fluctuation amount WA, which is a value prior to the correction, to the determination parameter Y, which is a value after the correction, is relatively small as shown in FIG. 6. In contrast, in the third case Q3 described above, since the intake air fluctuation amount ΔGAX is relatively large, the degree of change from the pressure fluctuation amount WA, which is a value prior to the correction, to the determination parameter Y, which is a value after the correction, is relatively large as shown in FIG. 7. By performing such correction, it is possible to calculate the determination parameter Y that reflects a change in the original PCV pressure W, which occurs in accordance with the state of the blow-by gas pipe 33. That is, the determination parameter Y reflects a change in the PCV pressure W, which corresponds to the state of the blow-by gas pipe 33, under the assumption that the intake air fluctuation amount ΔGA is substantially the same. Even if the actual intake air fluctuation amount ΔGA is relatively large, the determination parameter Y becomes small if there is a leakage anomaly in the blow-by gas pipe 33. By diagnosing the blow-by gas pipe 33 using such the above-described determination parameter Y, an accurate diagnosis result is obtained.

<Advantages of Embodiment>

(1) When there is a leakage anomaly in the blow-by gas pipe 33, the pressure fluctuation amount WA should normally be smaller than when the blow-by gas pipe 33 is normal. However, if the diagnosis process is executed without correcting the pressure fluctuation amount WA, the pressure fluctuation amount WA increases as the fluctuation amount of the intake air amount GA increases, and thus there is a possibility that the blow-by gas pipe 33 is erroneously determined to be normal. In this regard, in the present embodiment, when the intake air fluctuation amount ΔGA in the specific period H is relatively large, the diagnosing apparatus 50 corrects the pressure fluctuation amount WA to a smaller value, accordingly, as described in the section of the operation. Therefore, by performing such a correction, it is possible to prevent an erroneous determination regarding whether there is a leakage anomaly in the blow-by gas pipe 33.

(2) The diagnosing apparatus 50 determines whether there is a leakage anomaly in the blow-by gas pipe 33 based on the cumulative parameter Z, which is the cumulative value of the determination parameter Y calculated multiple times. As such, it is possible to obtain a determination result with high reliability compared to a case in which whether there is a leakage anomaly of the blow-by gas pipe 33 is determined based on a single value of the determination parameter Y, for example.

(3) The diagnosing apparatus 50 divides the pressure fluctuation amount WA by the difference between the minimum and maximum values of the intake air amount GA in the specific period H. By dividing the pressure fluctuation amount WA by the amount of change in the intake air amount GA during the specific period H, the pressure fluctuation amount WA is corrected to a value that is less affected by the intake air fluctuation amount ΔGA. In addition, in the configuration of the present embodiment, the intake air fluctuation amount ΔGA, which is used to determine whether the specific condition is met in step S25, is used to correct the pressure fluctuation amount WA. Therefore, it is not necessary to separately calculate a dedicated parameter for correcting the pressure fluctuation amount WA. In the present embodiment, it is possible to minimize the processing load of the diagnosing apparatus 50.

<Modifications>

The above-described embodiment may be modified as follows. The above-described embodiment and the following modifications can be combined as long as the combined modifications remain technically consistent with each other.

Regarding step S25, the content of item (B) of the specific condition is not limited to the example in the above-described embodiment. Even when the starting air amount and the ending air amount are not the minimum and maximum values of the time series of the first analysis data D1 as in the above-described embodiment, the intake air amount GA can be regarded as increasing if the intake air amount GA generally increases as the tendency of the entire time series. Item (B) may have any content if it allows for determination that the intake air amount GA is increasing as the tendency of the entire time series. For example, a coordinate system in which the horizontal axis represents time and the vertical axis represents the intake air amount GA is defined, and a regression line of a time-series of the intake air amount GA is calculated in the coordinate system. The fact that the slope of the regression line is positive may be defined as item (B).

Item (B) is optional. If the intake air fluctuation amount ΔGA is greater than or equal to the specified value K in the scale of the unit time in the above-described embodiment, there is a high possibility that the intake air amount GA is increasing in the time series of the first analysis data D1 in most cases.

The method of defining the specific period H is not limited to the example in the above-described embodiment. For example, the specific period H may be longer than the unit time. As an example of the case in which a period longer than the unit time is defined as the specific period H, the following mode (hereinafter, referred to as a first mode) may be employed. That is, in step S23 of the diagnosis process, the analysis data is continuously stored for a period obtained by integrating multiple of the unit time, for example, three or four unit times the unit time. Then, the time series of the analysis data is divided for each unit time, and it is determined whether the specific condition of the above-described embodiment is met for each unit time. When the specific condition is met in two or more continuous unit times, those continuous unit times may be collectively defined as one specific period H. The specific period H may be any period during which the intake air fluctuation amount ΔGA is greater than or equal to the specified value K.

The method of setting the unit time is not limited to the example in the above-described embodiment. The unit time may be longer than or equal to one second. If the intake air amount GA can be detected at least twice within the unit time by the air flow meter 72, the intake air fluctuation amount ΔGA can be calculated. Further, if the PCV pressure W can be detected at least twice within the unit time by the PCV pressure sensor 35, the pressure fluctuation amount WA can be calculated.

The pressure fluctuation amount WA, which is calculated in step S26, is not limited to the value obtained by accumulating values the pressure-difference value ΔW. For example, the absolute value of the difference between the maximum value and the minimum value in the time series of the second analysis data D2 may be defined as the pressure fluctuation amount WA. The pressure fluctuation amount WA may be any value that reflects the degree of fluctuation of the PCV pressure W during the specific period H.

When the specific period H is specified in step S25, the specific period H may be specified for a period during which the intake air amount GA is decreasing after the intake air amount GA has changed from increasing to decreasing. Then, in step S26, the pressure fluctuation amount WA during the decrease of the intake air amount GA may be calculated. As described above, in a situation in which a negative pressure is generated in the upstream intake passage 241, a change in the intake air amount GA and a change in the PCV pressure W are associated with each other. Therefore, in a situation in which a negative pressure is generated in the upstream intake passage 241, the PCV pressure W changes in accordance with a change in the intake air amount GA even while the intake air amount GA is decreasing. In this case, the PCV pressure W increases as the intake air amount GA decreases. The pressure fluctuation amount WA during the increase of the PCV pressure W may be calculated. In this case, the following mode may be employed. That is, the last value of the PCV pressure Win the time series of the second analysis data D2 is defined as a reference pressure. Then, a cumulative value of the values obtained by subtracting the respective data elements from the reference pressure is defined as the pressure fluctuation amount WA.

When the specific period H is specified for a period during which the intake air amount GA is decreasing, the following content may be employed as the specific condition of step S25, for example. Item (A) is that the absolute value of the intake air fluctuation amount ΔGA is greater than or equal to the specified value K. The intake air fluctuation amount ΔGA may have the same definition as that in the above-described embodiment, for example. Item (B) is that the starting air amount is the maximum value of the first analysis data D1, and the ending air amount is the minimum value of the first analysis data D1.

The pressure fluctuation amount WA may be individually calculated for a period during the intake air amount GA is increasing and a period during which the intake air amount GA is decreasing. The specific condition of step S25 may be defined to implement this mode.

Regarding step S24, the method of defining the intake air fluctuation amount ΔGA is not limited to the example in the above-described embodiment. Instead of simply using the value obtained by subtracting the starting air amount from the ending air amount as the intake air fluctuation amount ΔGA as in the above-described embodiment, a value obtained by dividing the obtained difference by the unit time may be used as the intake air fluctuation amount ΔGA. In this case, the specified value K is set to have the same unit as the intake air fluctuation amount ΔGA. In addition, the method of defining the intake air fluctuation amount ΔGA is not limited to the method using the ending air amount and the starting air amount in the first analysis data D1 as in the subsequent modifications. The intake air fluctuation amount ΔGA may be any value that represents the degree of change in the intake air amount GA per unit time.

In calculating the intake air fluctuation amount ΔGA, it is not necessary to use the first analysis data D1. That is, the intake air fluctuation amount ΔGA may be calculated in a manner other than the manner in which the intake air amount GA is temporarily stored in time series. For example, the diagnosing apparatus 50 may calculate, as the intake air fluctuation amount ΔGA, the absolute value of the difference between the values of the intake air amount GA received from the air flow meter 72 at two successive points in time. In this case, the reception interval of the detection signal from the air flow meter 72 is used as the unit time. When the intake air fluctuation amount ΔGA is calculated in this manner, the specific period H may be specified as follows, for example. That is, the intake air fluctuation amount ΔGA is repeatedly calculated, and a series of periods in which the repeatedly calculated the intake air fluctuation amount ΔGA is greater than or equal to the specified value K continues is specified as the specific period H. At this time, the specified value K may be calculated, from the specified value map, as a value corresponding to one of the two values of the intake air amount GA that have been used to calculate the intake air fluctuation amount ΔGA. When this mode (hereinafter, referred to as a second mode) is employed, the diagnosing apparatus 50 does not need to store the unit time in advance. The processing content of the diagnosis process may be changed to implement the second mode.

When the intake air fluctuation amount ΔGA is calculated in the second mode, the values of the intake air amount GA received successively from the air flow meter 72 may be used for calculation of the intake air fluctuation amount ΔGA while leaving out some of the received values. That is, instead of calculating the intake air fluctuation amount ΔGA by using two pieces of data that are received successively, the intake air fluctuation amount ΔGA may be calculated by using pieces of data that are spaced apart from each other, for example, every fourth or fifth pieces of data of the intake air amount GA that are received successively from the air flow meter 72. The number of pieces of data of the intake air amount GA to be skipped when calculating the intake air fluctuation amount ΔGA may be determined in advance.

As in the calculation of the intake air fluctuation amount ΔGA, it is not necessary to use the second analysis data D2 in calculating the intake air fluctuation amount WA. For example, each time the PCV pressure W is received from the PCV pressure sensor 35, the difference between the received value and a reference pressure may be calculated as the pressure difference value ΔW, and the pressure difference value ΔW may be sequentially accumulated to calculate the pressure fluctuation amount WA. In order to implement this mode, the processing content of the diagnosis process may be as follows. The PCV pressure W at the point in time when the intake air amount GA becomes greater than or equal to the determination air amount GATh is used as the reference pressure. Then, the pressure fluctuation amount WA is updated continuously as described above for a certain period of time from the point in time at which the intake air amount GA becomes greater than or equal to the determination air amount GATh. In this case, in parallel with the update of the pressure fluctuation amount WA, the intake air fluctuation amount ΔGA is repeatedly calculated using the second mode. Then, it is determined whether the certain period of time for which the pressure fluctuation amount WA is updated corresponds to the specific period H. When the certain period of time for which the pressure fluctuation amount WA is updated corresponds to the specific period H, the pressure fluctuation amount WA is used to calculate the determination parameter Y.

Regarding step S27, the method of correcting the pressure fluctuation amount WA is not limited to the example in the above-described embodiment. For example, as in the above-described first mode, in a case in which continuous unit times are collectively used as one specific period H, the pressure fluctuation amount WA may be divided by the absolute value of the difference between the maximum value and the minimum value of the intake air amount GA in the specific period H. The pressure fluctuation amount WA may be corrected by any method that meets following condition. That is, when the same pressure fluctuation amount WA is corrected, the pressure fluctuation amount WA may be corrected to a smaller value when the intake air fluctuation amount ΔGA in the specific period H is relatively large than when the intake air fluctuation amount ΔGA is relatively small. The intake air fluctuation amount ΔGA in the specific period H mentioned here is a value of the intake air fluctuation amount ΔGA that represents the specific period H. The intake air amount GA in the case in which continuous unit times are collectively used as one specific period H may be, for example, an average of values of the intake air fluctuation amount ΔGA in multiple unit time.

When the specific period H is specified for a period during which the intake air amount GA is decreasing, the pressure fluctuation amount WA may be divided by the absolute value of the intake air fluctuation amount ΔGA.

Instead of using the intake air fluctuation amount ΔGA as a parameter for correcting the pressure fluctuation amount WA, a separate parameter dedicated for correction may be prepared. For example, a cumulative value of the intake air amount GA detected by the air flow meter 72 from the start to the end of the specific period H may be used as the parameter for correction. Then, the pressure fluctuation amount WA may be divided by the cumulative value of the intake air amount GA. When the pressure fluctuation amount WA is divided by the cumulative value of the intake air amount GA, it is possible to perform correction in consideration of a change in the intake air amount GA over the entire specific period H, such as a change in the intake air amount GA in the middle of the specific period H.

As a parameter for correcting the pressure fluctuation amount WA, it is possible to use the absolute value of the difference between the maximum value and the minimum value of the accelerator operation amount ACC detected by the accelerator sensor 75 in the specific period H. The accelerator operation amount ACC is a parameter related to increase or decrease of the intake air amount GA. Therefore, if the information on the difference reflecting a change in the accelerator operation amount ACC is used to correct the pressure fluctuation amount WA, appropriate correction is performed to suppress the influence of the intake air fluctuation amount ΔGA. When the pressure fluctuation amount WA is corrected using the information on the accelerator operation amount ACC, the pressure fluctuation amount WA can be corrected to a value that is less affected by the intake air fluctuation amount ΔGA, for example, even if it is accidentally impossible to use information on changes in the intake air amount GA.

As a parameter for correcting the pressure fluctuation amount WA, the vehicle speed SP, which is detected by the vehicle speed sensor 74, or the acceleration of the vehicle 300 acquired from the vehicle speed SP may be used. An increase or decrease in the intake air amount GA is associated with acceleration or deceleration of the vehicle 300. Therefore, the vehicle speed SP and the acceleration, which are parameters related to acceleration and deceleration of the vehicle 300, are effective as parameters for correcting the pressure fluctuation amount WA.

The method of correcting the pressure fluctuation amount WA is not limited to dividing the pressure fluctuation amount WA. The method of correcting the pressure fluctuation amount WA may be any method as long as, when the same pressure fluctuation amount WA is corrected, the pressure fluctuation amount WA is corrected to a smaller value when the intake air fluctuation amount ΔGA in the specific period H is relatively large than when the intake air fluctuation amount ΔGA is relatively small.

The specified value K is not limited to the example in the above-described embodiment. The specified value K varies depending on the method of defining the intake air fluctuation amount ΔGA. The specified value K may be set in accordance with the method of defining the intake air fluctuation amount ΔGA employed in the diagnosis process. The specified value K may be any value if it meets the following condition. That is, any value may be used as long as the value is greater than or equal to the minimum value of the intake air fluctuation amount ΔGA that can occur in the internal combustion engine 10 when the vehicle 300 is accelerating with supercharging performed by the forced-induction device 11, and the pressure fluctuation amount WA has a clear difference between a state in which there is a leakage anomaly occurs and a normal state. The intake air fluctuation amount ΔGA has a positive value.

Instead of variably setting the specified value K in accordance with the intake air amount GA, the specified value K may be set to a uniform fixed value. For example, if the specified value K is set to a significantly large value, the condition of the specified value K is met regardless of the intake air amount GA. If the range of the intake air amount GA for calculating the pressure fluctuation amount WA is limited to a certain extent, the specified value K may be set to a value corresponding to that range of the intake air amount GA.

The method of defining the determination air amount GATh is not limited to the example in the above-described embodiment. Further, it is not necessary to provide the condition (step S22) that the intake air amount GA is greater than or equal to the determination air amount GATh as a precondition for calculating the fluctuation amount WA. As described above, the condition for specifying the specific period H includes the content that the intake air fluctuation amount ΔGA is greater than or equal to the specified value K. If the pressure fluctuation amount WA is calculated for the specific period H that meets this condition, the pressure fluctuation amount WA may be calculated for a situation in which the intake air amount GA is inevitably large to some extent even if the condition that the intake air amount GA is greater than or equal to the determination air amount GATh is not used. Then, the pressure fluctuation amount WA may be calculated for a period in which a negative pressure is generated in the upstream intake passage 241 and there is a difference in the pressure fluctuation amount WA between a state in which the blow-by gas pipe 33 is normal and a state in which there is a leakage anomaly.

As described above, the intake air amount GA and the PCV pressure W are related to each other. Thus, instead of the condition that the intake air amount GA is greater than or equal to the determination air amount GATh, a condition that the PCV pressure W is less than or equal to a predetermined determination pressure may be used as a condition for detecting a situation in which the negative pressure is generated in the upstream intake passage 241. The determination pressure in this case may be, for example, the PCV pressure W at which the intake air amount GA is the determination air amount GATh of the above-described embodiment in a state in which the blow-by gas pipe 33 is normal. Such a determination pressure is less than the atmospheric pressure M. That is, when the condition that the PCV pressure W is less than or equal to the determination pressure is used as a premise for calculating the pressure fluctuation amount WA, the pressure fluctuation amount WA is basically not calculated in the complete exposure state of the blow-by gas pipe 33. Then, whether there is a leakage anomaly is diagnosed mainly for only the partial exposure state of the blow-by gas pipe 33. Regarding only a leakage anomaly of the complete exposure state, it is possible to detect a leakage anomaly without using the pressure fluctuation amount WA. For example, if the PCV pressure W is maintained at a value in the vicinity of the atmospheric pressure M even though the intake air amount GA is significantly large, it can be determined that there is a leakage anomaly of the complete exposure state. On the other hand, in order to detect a leakage anomaly of the partial exposure state, it is necessary to perform diagnosis using the pressure fluctuation amount WA and the determination parameter Y. From this point of view, it is also effective to use the condition that the PCV pressure W is less than or equal to the determination pressure as described above in diagnosing whether there is a leakage anomaly only in the partial exposure state of the blow-by gas pipe 33.

In specifying the specific period H, instead of the intake air fluctuation amount ΔGA itself, another parameter that is an index of the intake air fluctuation amount ΔGA may be used. For example, the accelerator operation amount ACC may be used as such a parameter. As described above, increase or decrease in the accelerator operation amount ACC and increase or decrease in the intake air amount GA are related to each other. Therefore, the relationship between increase or decrease in the accelerator operation amount ACC and increase or decrease in the intake air amount GA is examined in advance. If a specified value dedicated to the accelerator operation amount ACC corresponding to the specified value K of the intake air fluctuation amount ΔGA is set based on the relationship, it is also possible to specify the specific period H using the information on changes in the accelerator operation amount ACC. Then, a period in which the fluctuation amount per unit time of the accelerator operation amount ACC is greater than or equal to the dedicated specified value may be specified as the specific period H, in which the intake air fluctuation amount ΔGA is greater than or equal to the specified value K. The fluctuation amount per unit time of the accelerator operation amount ACC may be calculated from a time series of the accelerator operation amount ACC in a predetermined unit time, or may be a difference of the accelerator operation amount ACC received from the accelerator sensor 75 between two consecutive points in time.

The PCV pressure W may be used as a parameter used to specify the specific period H. When the blow-by gas pipe 33 is normal or when there is a leakage anomaly of the partial exposure state in the blow-by gas pipe 33, a change in the intake air amount GA and a change in the PCV pressure W are associated with each other. Therefore, a period in which the fluctuation amount per unit time of the PCV pressure W is greater than or equal to a specified value dedicated to the PCV pressure W may be specified as the specific period H, in which the intake air fluctuation amount ΔGA is greater than or equal to the specified value K. In order to detect only a leakage anomaly in the partial exposure state, such a mode may be implemented. The specified value dedicated to the PCV pressure W may be set in correspondence with the specified value K of the intake air fluctuation amount ΔGA on the assumption that the blow-by gas pipe 33 is normal, for example, based on the correspondence relationship between the intake air amount GA and the PCV pressure W. The method of defining the fluctuation amount per unit time of the PCV pressure W may be determined in the same manner as the fluctuation amount per unit time of the accelerator operation amount ACC in the above-described modification. In this manner, the specific period H may be specified using the PCV pressure W itself. Also, the pressure fluctuation amount WA in the specific period H may be corrected by using, for example, information on changes in the accelerator operation amount ACC.

The method of determining whether there is a leakage anomaly in the blow-by gas pipe 33 is not limited to the example in the above-described embodiment. The determining method may be changed if it uses the determination parameter Y. For example, whether there is a leakage anomaly may be determined using the product of multiple values of the determination parameter Y. Whether there is a leakage anomaly may be determined based on a single calculated value of the determination parameter Y. As long as whether there is a leakage anomaly is determined reliably, any determination method may be used.

The processing device that controls the internal combustion engine 10 and the diagnosing apparatus 50 may be provided as separate processing devices. The diagnosing apparatus 50 may be changed if it is able to receive information necessary for executing the diagnosis process. One of the pieces of information necessary for the diagnosis process is the PCV pressure W.

The overall configuration of the internal combustion engine is not limited to the example in the above-described embodiment. For example, a forced-induction device of a type driven by the power of the crankshaft 14 may be employed instead of the exhaust-driven forced-induction device.

The installation position of the PCV pressure sensor 35 may be changed from the example in the above-described embodiment. For example, the PCV pressure sensor 35 may be provided in the middle of the blow-by gas pipe 33. In this case, it is possible to diagnose whether there is a leakage anomaly between the installation site of the PCV pressure sensor 35 and the portion connected to the intake passage in the blow-by gas pipe 33. The PCV pressure sensor 35 can accurately detect the fluctuation of the pressure in the portion between the upstream intake passage 241, which is the source of negative pressure, and the installation site of the PCV pressure sensor 35.

As the PCV pressure sensor, a sensor that detects a gauge pressure, which is a relative pressure with reference to the atmospheric pressure M, may be employed.

The configuration of the blow-by gas passage is not limited to the example in the above-described embodiment. The blow-by gas passage may connect the crank chamber 17 to the upstream intake passage 241. The blow-by gas passage may be a passage that directly connects the crank chamber 17 and the upstream intake passage 241 to each other without the accumulation space 23 and the connecting passage 21 in between. The PCV pressure sensor 35 may be provided in the middle of the blow-by gas passage.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An anomaly diagnosing apparatus for a vehicle on-board internal combustion engine, wherein the vehicle on-board internal combustion engine includes:

a forced-induction device that includes a compressor wheel;

an intake passage for conducting intake air into the vehicle on-board internal combustion engine;

a blow-by gas passage that connects a portion of the intake passage that is upstream of the compressor wheel to an interior of a crankcase; and a PCV pressure sensor that is disposed in the blow-by gas passage and detects a pressure in the blow-by gas passage as a PCV pressure, a period during which an intake fluctuation amount, which is a fluctuation amount of an intake air amount per unit time, is greater than or equal to a specified value is defined as a specific period, and the anomaly diagnosing apparatus comprises processing circuitry that is configured to execute:

a first process of calculating a pressure fluctuation amount, which is a fluctuation amount of the PCV pressure in the specific period;

a second process of correcting the pressure fluctuation amount to a smaller value when the intake air fluctuation amount in the specific period is relatively large than when the intake air fluctuation amount is relatively small;

a third process of determining, based on the corrected pressure fluctuation amount, whether there is an anomaly in a portion of the blow-by gas passage between a section in which the PCV pressure sensor is installed and a portion that is connected to the intake passage; and control the vehicle on-board internal combustion engine based upon the determination as to whether there is the anomaly in the portion of the blow-by gas passage between the section in which the PCV pressure sensor is installed and the portion that is connected to the intake passage.

2. The anomaly diagnosing apparatus for the vehicle on-board internal combustion engine according to claim 1, wherein the processing circuitry is configured to set a flag to ON when the determination results in a determination that there is the anomaly in the portion of the blow-by gas passage between the section in which the PCV pressure sensor is installed and the portion that is connected to the intake passage, set the flag to OFF when the determination results in a determination that there is not the anomaly in the portion of the blow-by gas passage between the section in which the PCV pressure sensor is installed and the portion that is connected to the intake passage, and control the vehicle on-board internal combustion engine based upon the setting of the flag.

3. The anomaly diagnosing apparatus for the vehicle on-board internal combustion engine according to claim 1, wherein the specific period is one of different specific periods, and the processing circuitry is configured to calculate the corrected pressure fluctuation amount multiple times by repeatedly executing the first process and the second process for the different specific periods, and determine, in the third process, that there is an anomaly when a cumulative value of the corrected pressure fluctuation amount, which has been calculated multiple times, is less than a predetermined determination threshold.

4. The anomaly diagnosing apparatus for the vehicle on-board internal combustion engine according to claim 1, wherein the vehicle on-board internal combustion engine includes an air flow meter that detects the intake air amount, the PCV pressure is one of multiple PCV pressures detected by the PCV pressure sensor from a start to an end of the specific period, and the processing circuitry is configured to in the first process, calculate, as the pressure fluctuation amount, a cumulative value of a difference between each of the multiple PCV pressures and the PCV pressure detected by the PCV pressure sensor at a starting point of the specific period, and in the second process, as the correction of the pressure fluctuation amount, divide the pressure fluctuation amount by a difference between a maximum value and a minimum value of the intake air amount in the specific period detected by the air flow meter.

5. The anomaly diagnosing apparatus for the vehicle on-board internal combustion engine according to claim 1, wherein the vehicle on-board internal combustion engine includes an air flow meter that detects the intake air amount, the PCV pressure is one of multiple PCV pressures detected by the PCV pressure sensor from a start to an end of the specific period, and the processing circuitry is configured to in the first process, calculate, as the pressure fluctuation amount, a cumulative value of a difference between each of the multiple PCV pressures and the PCV pressure detected by the PCV pressure sensor at a starting point of the specific period, and in the second process, as the correction of the pressure fluctuation amount, divide the pressure fluctuation amount by a cumulative value of the intake air amount from a start to an end of the specific period detected by the air flow meter.

6. The anomaly diagnosing apparatus for the vehicle on-board internal combustion engine according to claim 1, wherein a depression amount of an accelerator pedal of a vehicle on which the vehicle on-board internal combustion engine is mounted is defined as an accelerator operation amount, the vehicle includes an accelerator sensor that detects the accelerator operation amount, the PCV pressure is one of multiple PCV pressures detected by the PCV pressure sensor from a start to an end of the specific period, and the processing circuitry is configured to in the first process, calculate, as the pressure fluctuation amount, a cumulative value of a difference between each of the multiple PCV pressures and the PCV pressure detected by the PCV pressure sensor at a starting point of the specific period, and in the second process, as the correction of the pressure fluctuation amount, divide the pressure fluctuation amount by a difference between a maximum value and a minimum value of the accelerator operation amount in the specific period detected by the accelerator sensor.

7. An anomaly diagnosing method for a vehicle on-board internal combustion engine, wherein the vehicle on-board internal combustion engine includes:

a forced-induction device that includes a compressor wheel;

an intake passage for conducting intake air into the vehicle on-board internal combustion engine;

a blow-by gas passage that connects a portion of the intake passage that is upstream of the compressor wheel to an interior of a crankcase; and a PCV pressure sensor that is disposed in the blow-by gas passage and detects a pressure in the blow-by gas passage as a PCV pressure, a period during which an intake fluctuation amount, which is a fluctuation amount of an intake air amount per unit time, is greater than or equal to a specified value is defined as a specific period, and the anomaly diagnosing method comprises:

calculating a pressure fluctuation amount, which is a fluctuation amount of the PCV pressure in the specific period;

correcting the pressure fluctuation amount to a smaller value when the intake air fluctuation amount in the specific period is relatively large than when the intake air fluctuation amount is relatively small;

determining, based on the corrected pressure fluctuation amount, whether there is an anomaly in a portion of the blow-by gas passage between a section in which the PCV pressure sensor is installed and a portion that is connected to the intake passage; and control the vehicle on-board internal combustion engine based upon the determination as to whether there is the anomaly in the portion of the blow-by gas passage between the section in which the PCV pressure sensor is installed and the portion that is connected to the intake passage.

* * * * *